United States Patent
Lin

(10) Patent No.: US 7,706,084 B2
(45) Date of Patent: Apr. 27, 2010

(54) SURVEILLANCE CAMERA WITH LENS ADJUSTMENT MECHANISM

(75) Inventor: Sung-Ken Lin, Taipei County (TW)

(73) Assignee: Camdeor Technology Co., Ltd., Sanchong, Taipei County (TW)

( * ) Notice: Subject to any disclaimer, the term of this patent is extended or adjusted under 35 U.S.C. 154(b) by 456 days.

(21) Appl. No.: 11/861,250

(22) Filed: Sep. 25, 2007

(65) Prior Publication Data
US 2008/0074495 A1   Mar. 27, 2008

(30) Foreign Application Priority Data
Sep. 26, 2006   (TW) .............................. 95217148 U

(51) Int. Cl.
G02B 15/14 (2006.01)
G02B 7/02 (2006.01)
(52) U.S. Cl. .................. 359/694; 359/819; 359/822; 359/830
(58) Field of Classification Search .............. 359/694, 359/819–830; 396/73, 79
See application file for complete search history.

(56) References Cited

U.S. PATENT DOCUMENTS

| 5,410,432 | A | * | 4/1995 | Kobayashi | 359/740 |
| 6,919,995 | B2 | * | 7/2005 | Nomura et al. | 359/695 |
| 2006/0103954 | A1 | | 5/2006 | Hamasaki et al. | 359/825 |
| 2006/0256455 | A1 | | 11/2006 | Nishimoto | 359/830 |

* cited by examiner

Primary Examiner—Mohammed Hasan
(74) Attorney, Agent, or Firm—Winston Hsu

(57) ABSTRACT

A surveillance camera has a housing, a photographic lens installed in the housing, and an adjustment mechanism connected to the photographic lens. The photographic lens has a first adjustable lens for adjusting distance, and a second adjustable lens for adjusting focal length. A distance adjustment ring is coupled to the first adjustable lens, and a focal length adjustment ring is coupled to the second adjustable lens. The adjustment mechanism has a support, a first adjustment screw, and a second adjustment screw. A first adjustment ring installed on the distance adjustment ring of the photographic lens has teeth corresponding to threading of the first adjustment screw, and a second adjustment ring installed on the focal length adjustment ring of the photographic lens has teeth corresponding to threading of the second adjustment screw.

12 Claims, 8 Drawing Sheets

SURVEILLANCE CAMERA WITH LENS ADJUSTMENT MECHANISM

BACKGROUND OF THE INVENTION

1. Field of the Invention

The present invention relates to surveillance cameras, and more particularly, to a surveillance camera with an adjustment mechanism for adjusting distance and focal length of a photographic lens in the surveillance camera.

2. Description of the Prior Art

Please refer to FIG. 8, which is a diagram of a surveillance camera according to the prior art. The surveillance camera comprises a housing 40. The front end of the housing 40 has a front opening 41, and the rear end of the housing 40 has a rear opening 42. A seal 43 is installed at the rear opening 42, a lens cover 44 is installed at the front opening 41, and a photographic lens 45 is installed in the housing 40 behind the lens cover 44.

The surveillance camera can be fixed at an appropriate position, and the photographic lens 45 can be adjusted to an optimum distance and focal length.

However, the surveillance camera is typically installed in a location relatively high above the ground. Thus, when the distance and focal length of the photographic lens 45 require adjustment, the lens cover 44 is first removed, after which a worker can attempt to refocus the photographic lens 45 by reaching through the front opening 41 into the housing 40 to adjust the distance and focal length of the lens by turning appropriate adjustment rings of the lens.

The photographic lens 45 and the housing 40 are only separated by a marginal gap. Therefore, it is very tedious and difficult for the worker to adjust the distance and focal length of the photographic lens 45, and when the distance and focal length of the photographic lens 45 need to be adjusted finely, the difficulty increases. Thus, it is difficult to adjust the distance and focal length of the photographic lens of the surveillance camera of the prior art, and fine adjustment is very difficult.

SUMMARY OF THE INVENTION

According to the present invention, a surveillance camera comprises a housing and a photographic lens installed in the housing. The photographic lens comprises a first adjustable lens for adjusting distance, a second adjustable lens for adjusting focal length, a distance adjustment ring coupled to the first adjustable lens, and a focal length adjustment ring coupled to the second adjustable lens. The surveillance camera further comprises an adjustment mechanism connected to the photographic lens comprising a support for holding the photographic lens. The support comprises a top support piece having a first hole and a second hole, and a bottom support piece having a first hole and a second hole. The adjustment mechanism further comprises a first adjustment screw held by the first holes of the top support piece and the bottom support piece, a second adjustment screw held by the second holes of the top support piece and the bottom support piece, a first adjustment ring installed on the distance adjustment ring of the photographic lens comprising teeth corresponding to threading of the first adjustment screw, and a second adjustment ring installed on the focal length adjustment ring of the photographic lens comprising teeth corresponding to threading of the second adjustment screw.

According to a second embodiment of the present invention, a surveillance camera comprises a housing and a photographic lens installed in the housing. The photographic lens comprises a first adjustable lens for adjusting distance, a second adjustable lens for adjusting focal length, a distance adjustment ring coupled to the first adjustable lens, and a focal length adjustment ring coupled to the second adjustable lens. The surveillance camera further comprises an adjustment mechanism comprising a support for holding the photographic lens. The support comprises a top support piece comprising a first hole and a second hole, and a bottom support piece comprising a first hole aligned with the first hole of the top support piece and a second hole aligned with the second hole of the top support piece. The adjustment mechanism further comprises a first adjustment ring installed on the distance adjustment ring of the photographic lens, a side of the first adjustment ring comprising a plurality of teeth, a second adjustment ring installed on the focal length adjustment ring of the photographic lens, a side of the second adjustment ring comprising a plurality of teeth, a first adjustment screw held by the first hole of the top support piece and the first hole of the bottom support piece, the first adjustment screw comprising threading corresponding to the plurality of teeth of the first adjustment ring, and an end of the first adjustment screw comprising a cavity, and a second adjustment screw held by the second hole of the top support piece and the second hole of the bottom support piece, the second adjustment screw comprising threading corresponding to the plurality of teeth of the second adjustment ring, and an end of the second adjustment screw comprising a cavity. The surveillance camera further comprises a first handle connected to the first adjustment screw, and a second handle connected to the second adjustment screw.

According to a third embodiment of the present invention, a surveillance camera comprises a housing comprising a first hole and a second hole, and a photographic lens installed in the housing. The photographic lens comprises a first adjustable lens for adjusting distance, a second adjustable lens for adjusting focal length, a distance adjustment ring coupled to the first adjustable lens, and a focal length adjustment ring coupled to the second adjustable lens. The surveillance camera further comprises an adjustment mechanism comprising a support for holding the photographic lens. The support comprises a top support piece having a first hole aligned with the first hole of the housing and a second hole aligned with the second hole of the housing, and a bottom support piece having a first hole aligned with the first hole of the housing and a second hole aligned with the second hole of the housing. The adjustment mechanism further comprises a first adjustment ring installed on the distance adjustment ring of the photographic lens, a side of the first adjustment ring comprising a plurality of teeth, a second adjustment ring installed on the focal length adjustment ring of the photographic lens, a side of the second adjustment ring comprising a plurality of teeth, a first adjustment screw connected between the first hole of the top support piece and the first hole of the housing, the first adjustment screw comprising threading corresponding to the plurality of teeth of the first adjustment ring, and an end of the first adjustment screw comprising a cavity, and a second adjustment screw connected between the second hole of the top support piece and the second hole of the housing, the second adjustment screw comprising threading corresponding to the plurality of teeth of the second adjustment ring, and an end of the second adjustment screw comprising a cavity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
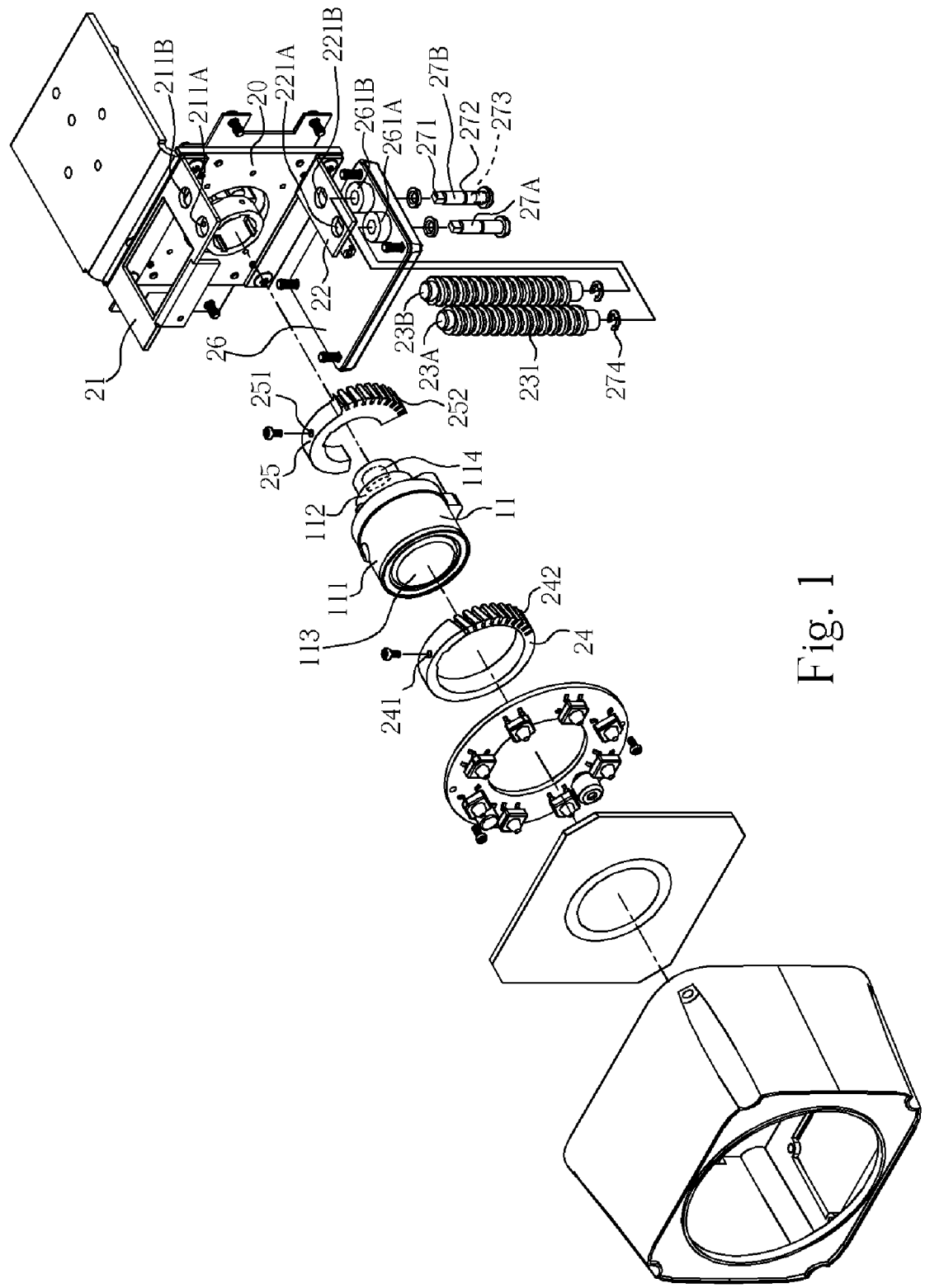
FIG. 1 is an exploded diagram of a surveillance camera according to the first embodiment of the present invention.
Figure 2:
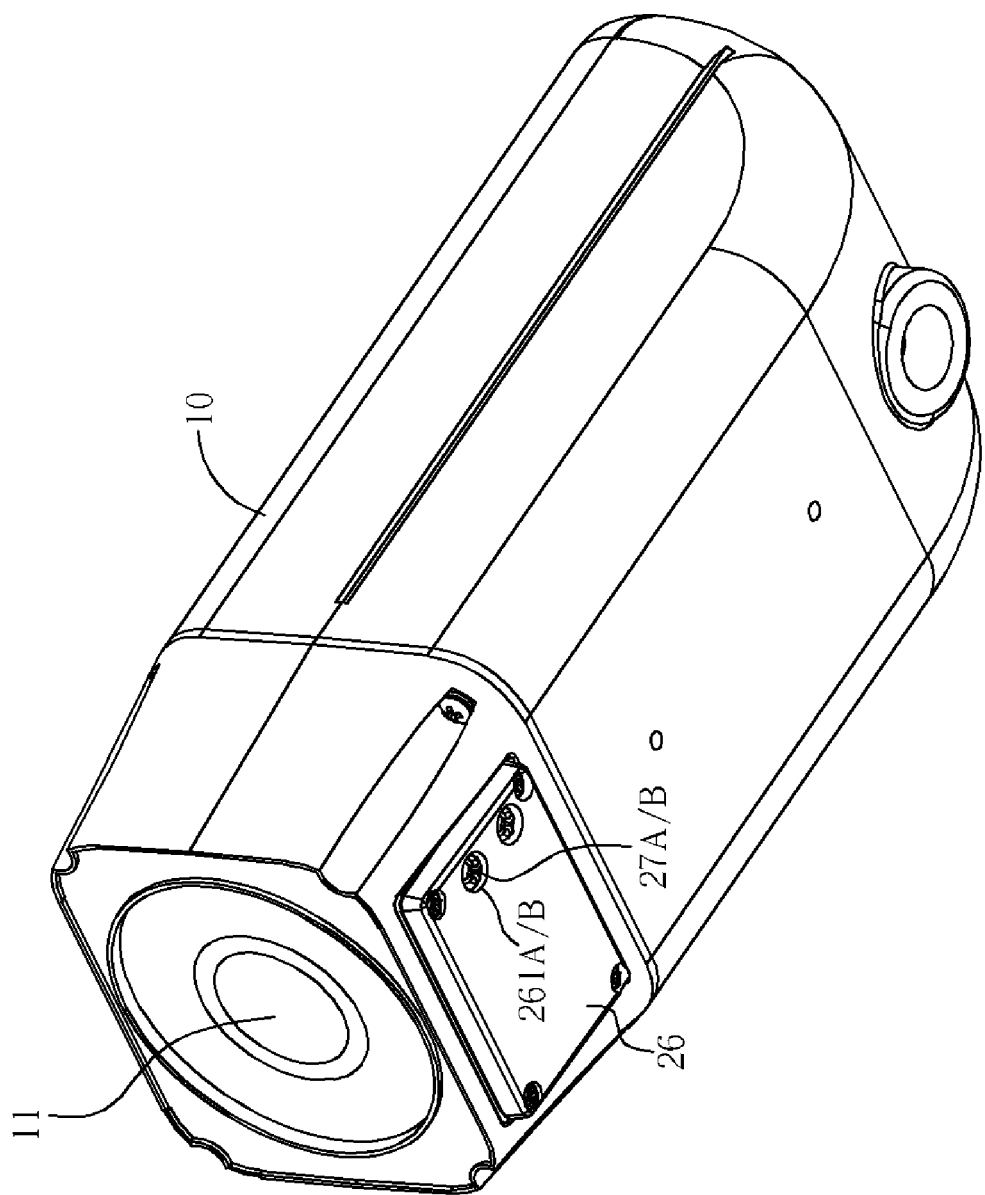
FIG. 2 is a perspective view of the surveillance camera of FIG. 1.

Please refer to FIG. 1 and FIG. 2, which are diagrams of a surveillance camera according to a first embodiment of the present invention. The surveillance camera comprises a housing 10. A photographic lens 11 is installed in the housing and comprises a first adjustable lens 113 for adjusting distance of the photographic lens, a second adjustable lens 114 for adjusting focal length of the photographic lens, a distance adjustment ring 111 coupled to the first adjustable lens 113 for moving the first adjustable lens 113, and a focal length adjustment ring 112 coupled to the second adjustable lens 114 for moving the second adjustable lens 114. The surveillance camera further comprises an adjustment mechanism comprising a support 20, a first adjustment screw 23A, a second adjustment screw 23B, a primary adjustment ring 24, and a secondary adjustment ring 25. Optionally, the surveillance camera can also comprise a bottom panel 26 that is installed on the housing, a first rotatable shaft 27A, and a second rotatable shaft 27B. The support 20 is installed in the housing 10, and holds the photographic lens 11 in place. The support 20 comprises a top support piece 21 and a bottom support piece 22. The top support piece 21 comprises a first hole 211A and a second hole 211B, and the bottom support piece 22 comprises a first hole 221A and a second hole 221B. The first hole 221A of the bottom support piece 22 is aligned with the first hole 211A of the top support piece 21. Likewise, the second hole 221B of the bottom support piece 22 is aligned with the second hole 211B of the top support piece 21. The first adjustment screw 23A is held by the first hole 211A and the first hole 221A as shown in FIG. 1. Likewise, the second adjustment screw 23B is held by the second hole 211B and the second hole 221B as shown in FIG. 1. Threading 231 is formed in each adjustment screw 23A/B.

Figure 3:
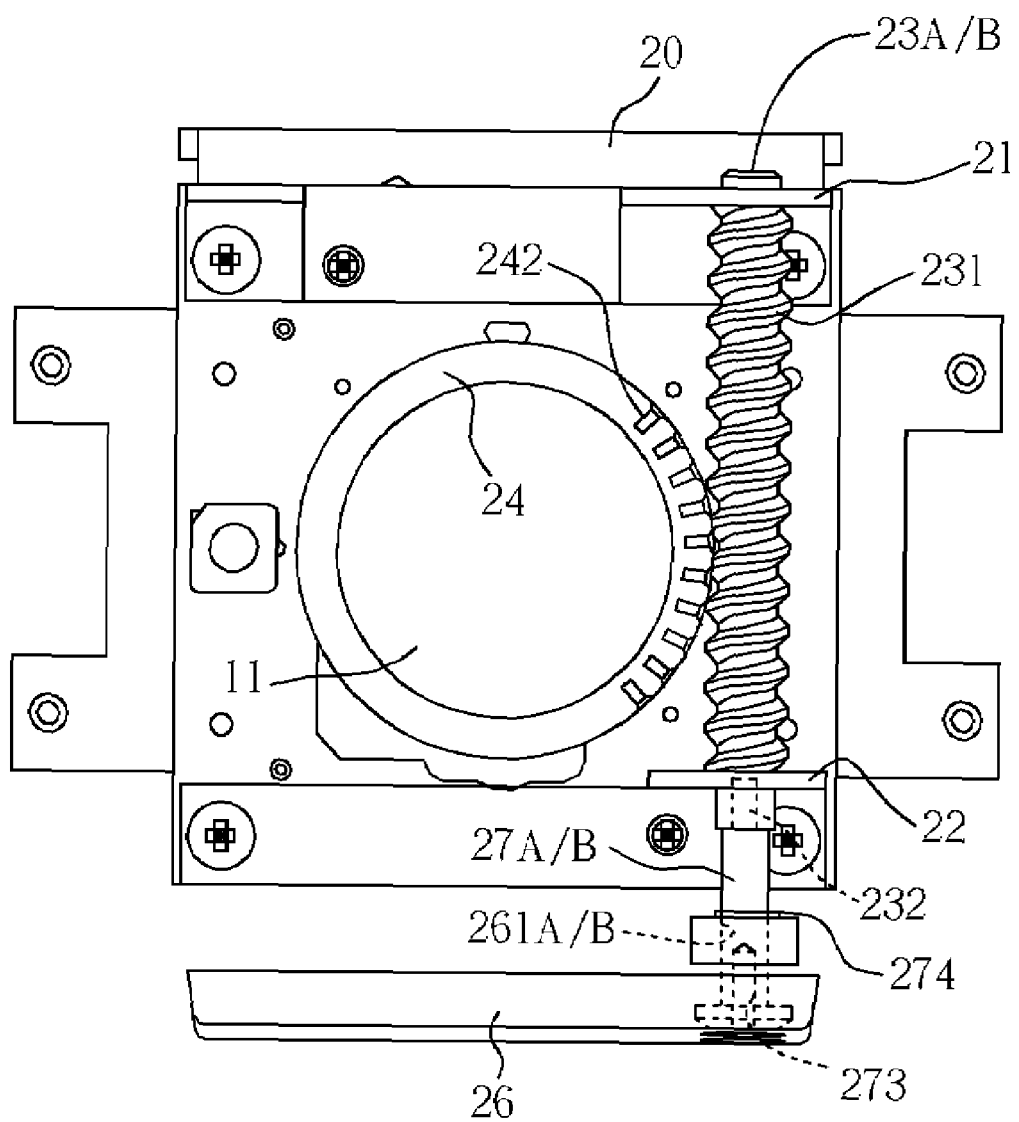
FIG. 3 is a front-view diagram of an adjustment mechanism of the surveillance camera of FIG. 1.

Please refer to FIG. 3, which is a front view of the adjustment mechanism shown in FIG. 1. An end of each adjustment screw 23A/B has a cavity 232 corresponding to the shape of the end of the rotatable shafts 27A/B. In this embodiment, the shape of the end of the rotatable shaft 27A/B and the cavity 232 is rectangular. However, this is not a limitation of the present invention. The shape of the end of the rotatable shaft 27A/B and the cavity 232 could also be a rhombus, an S-shape, or any other shape that allows for rotation of the rotatable shaft 27A/B to induce rotation of the adjustment screw 23A/B through connection between the rotatable shaft 27A/B and the adjustment screw 23A/B.

Figure 4:
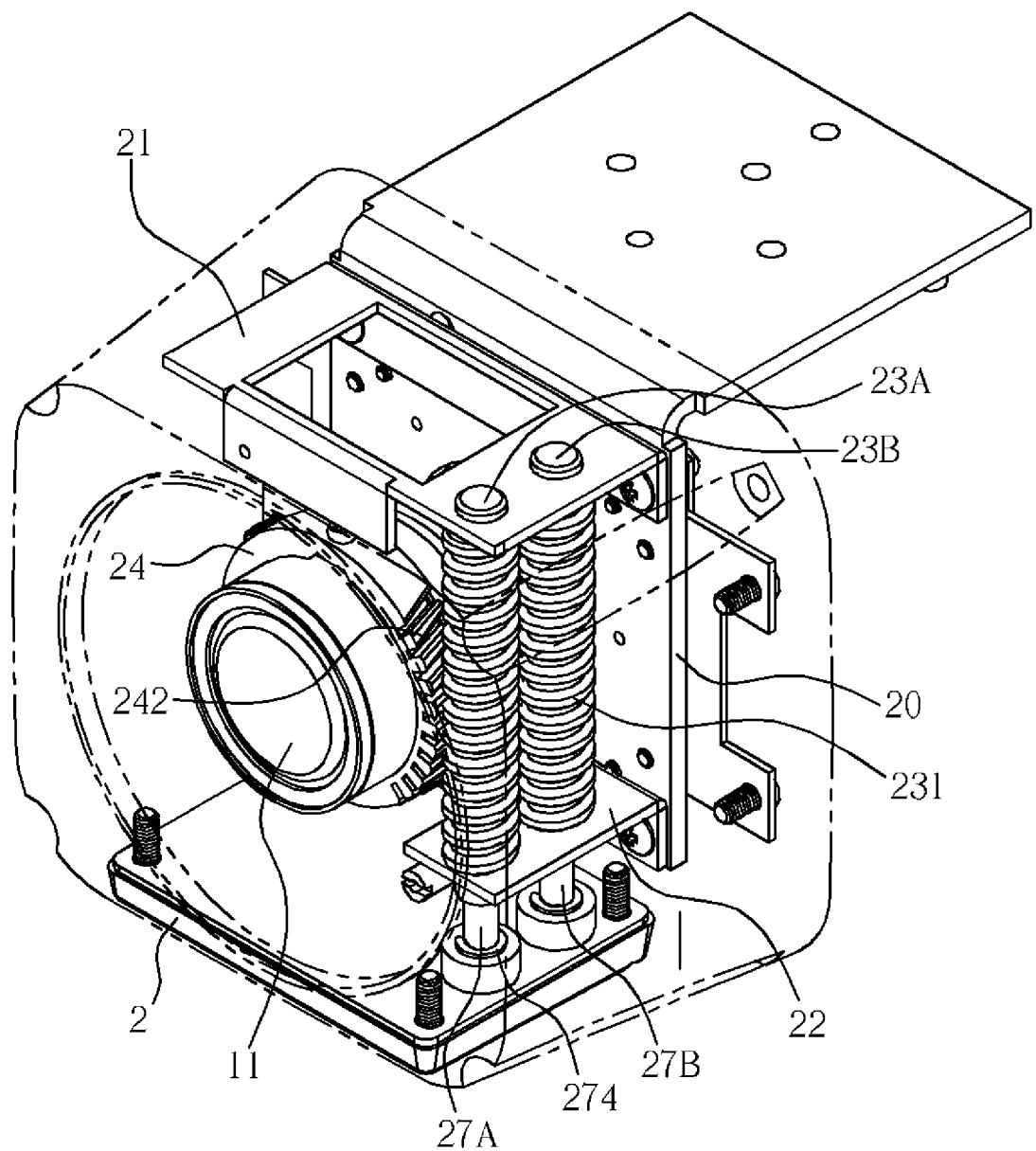
FIG. 4 is a perspective diagram of the adjustment mechanism of FIG. 3.
Figure 5:
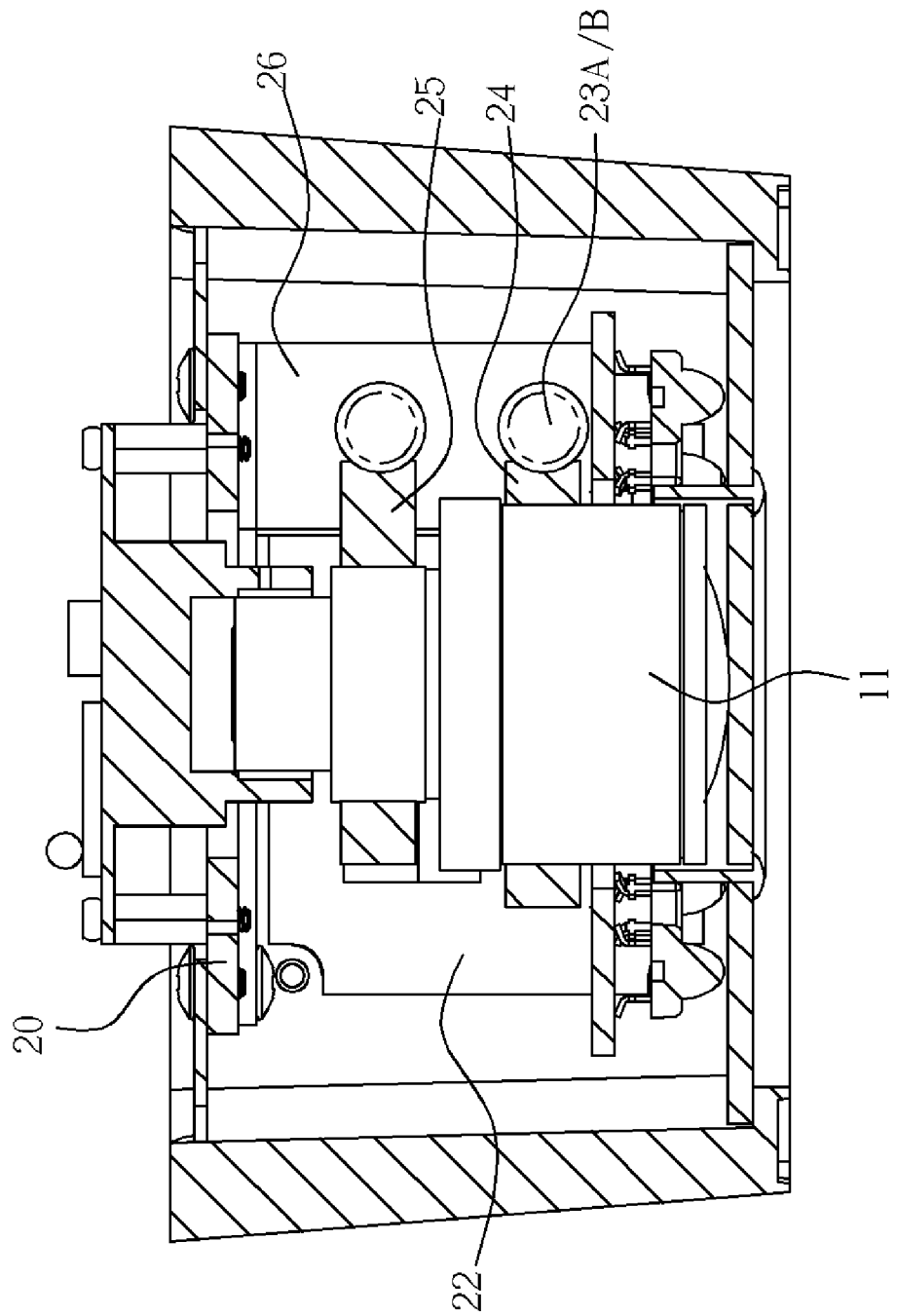
FIG. 5 is a top view of the adjustment mechanism of FIG. 3.

The primary adjustment ring 24 is installed on the distance adjustment ring 111 of the photographic lens 11, and comprises a hole 241 through which a small screw (shown in FIG. 1) can pass to connect the primary adjustment ring 24 to the distance adjustment ring 111 of the photographic lens 11. Please refer to FIG. 4, which is a perspective diagram of the adjustment mechanism, and FIG. 5, which is a top view of the adjustment mechanism. A side of the primary adjustment ring 24 generally facing the first adjustment screw 23A comprises a plurality of teeth 242 corresponding to the threading 231 of the first adjustment screw 23A.

The secondary adjustment ring 25 is installed on the focal length adjustment ring 112 of the photographic lens 11, and like the primary adjustment ring 24, the secondary adjustment ring 25 comprises a hole 251 through which a screw can pass to connect the secondary adjustment ring 25 to the focal length adjustment ring 112 of the photographic lens 11. A side of the secondary adjustment ring 25 generally facing the second adjustment screw 23B comprises a plurality of teeth 252 corresponding to the threads 231 of the adjustment screw 23B.

The bottom panel 26 is connected to the bottom side of the housing 10 by screws (as shown in FIG. 2). The bottom panel 26 comprises holes 261A/B aligned with the holes 221A/B of the bottom support piece 22 and the holes 211A/B of the top support piece 21.

Each rotatable shaft 27A/B passes through the holes 261A/B of the bottom panel 26 respectively. The end of each of the rotatable shafts 27A/B comprises a protrusion 271 that matches the cavity 232 of the adjustment screws 23A/B. A groove 272 is formed along the circumference of the rotatable shafts 27A/B, and a C-shaped washer 274 is clipped onto the groove 272. The C-shaped washer 274 contacts with the edge of the hole 261A/B of the bottom panel 26, so that the rotatable shaft 27A/B will not disconnect from the hole 261A/B. The head of the rotatable shaft 27A/B has a cavity 273 that can be a flathead, Phillips, or polygonal shape.

When the surveillance camera is set in an appropriate location, the worker can insert an adjustment tool, such as a Phillips screwdriver, a flathead screwdriver, or a hex key, etc., into the cavity 273 of the rotation shaft 27A/B to turn the rotation shaft 27A/B. As the rotation shaft 27A/B turns, the adjustment screw 23A/B turns with the rotation shaft 27A/B. Due to the teeth 242 of the primary adjustment ring 24 and the teeth 252 of the secondary adjustment ring 25, which are intermeshed with the threads 231 of the respective adjustment screws 23A/B, the primary adjustment ring 24 or the secondary adjustment ring 25 will turn when the adjustment screws 23A/B turn. When the primary adjustment ring 24 or the secondary adjustment ring 25 is turned, the distance adjustment ring 111 or the focal length adjustment ring 112 of the photographic lens 11 turns to adjust the distance or focal length of the photographic lens 11.

In the structure described above, when the surveillance camera is set in an appropriate position, a hand tool can be used to turn the rotatable shaft 27A/B, whereby the distance and focal length of the photographic lens 11 can be adjusted. By only turning the rotatable shaft 27A/B, the adjustment process can be completed. Thus, the present invention adjustment mechanism makes adjustment of the photographic lens 11 very convenient, reducing the difficulty of adjustment for the worker.

Figure 6:
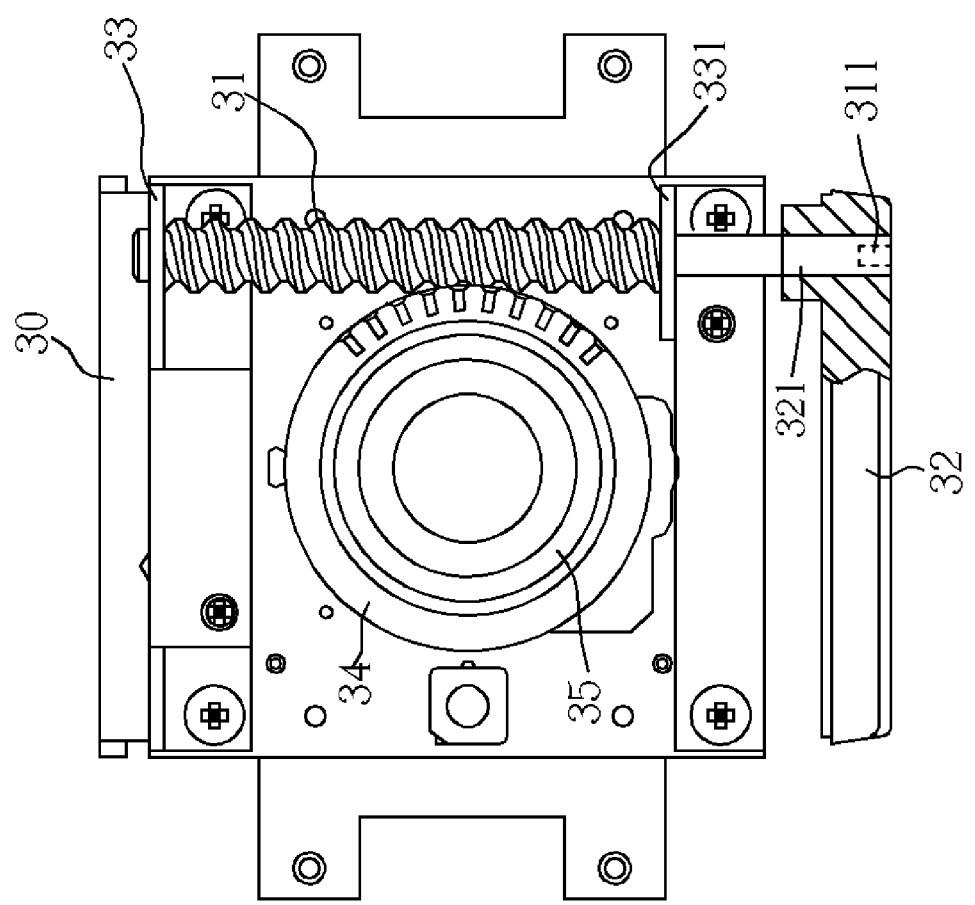
FIG. 6 is a diagram of an adjustment mechanism of the surveillance camera according to the second embodiment of the present invention.

Please refer to FIG. 6, which is a diagram of an adjustment mechanism installed in a surveillance camera according to a second embodiment of the present invention. The structure of the second embodiment is similar to the structure of the first embodiment shown in FIG. 3. For simplicity, description is only given for a primary adjustment ring 34, which is equivalent to the primary adjustment ring 24 of the first embodiment. The description for the secondary adjustment ring is the same, and therefore omitted. In the second embodiment, an adjustment screw 31 passes through a hole of a top support piece 33 and a hole of a bottom support piece 331 connected to a support 30. The hole of the top support piece 33 is aligned with the hole of the bottom support piece 331. An end of the adjustment screw 31 extends through the hole 331 of the bottom support piece into a cavity 321 of a handle 32. The cavity 321 of the handle 32 has a protrusion for connecting to the adjustment screw 31. The end of the adjustment screw 31 is shaped to match the hole 321 of the handle 32 and has a cavity 311 for connecting to the protrusion of the handle 32. In this way, the adjustment screw 31 is installed between the handle 32 and the top support piece 33. The cavity 311 and the protrusion of the cavity 321 can be polygonal-, flathead-, or Phillips-shaped. When the handle 32 is connected to the adjustment screw 31 and turned, the adjustment ring 34 turns with the adjustment screw 31, and the distance and focal length of the photographic lens 35 can be adjusted.

Figure 7:
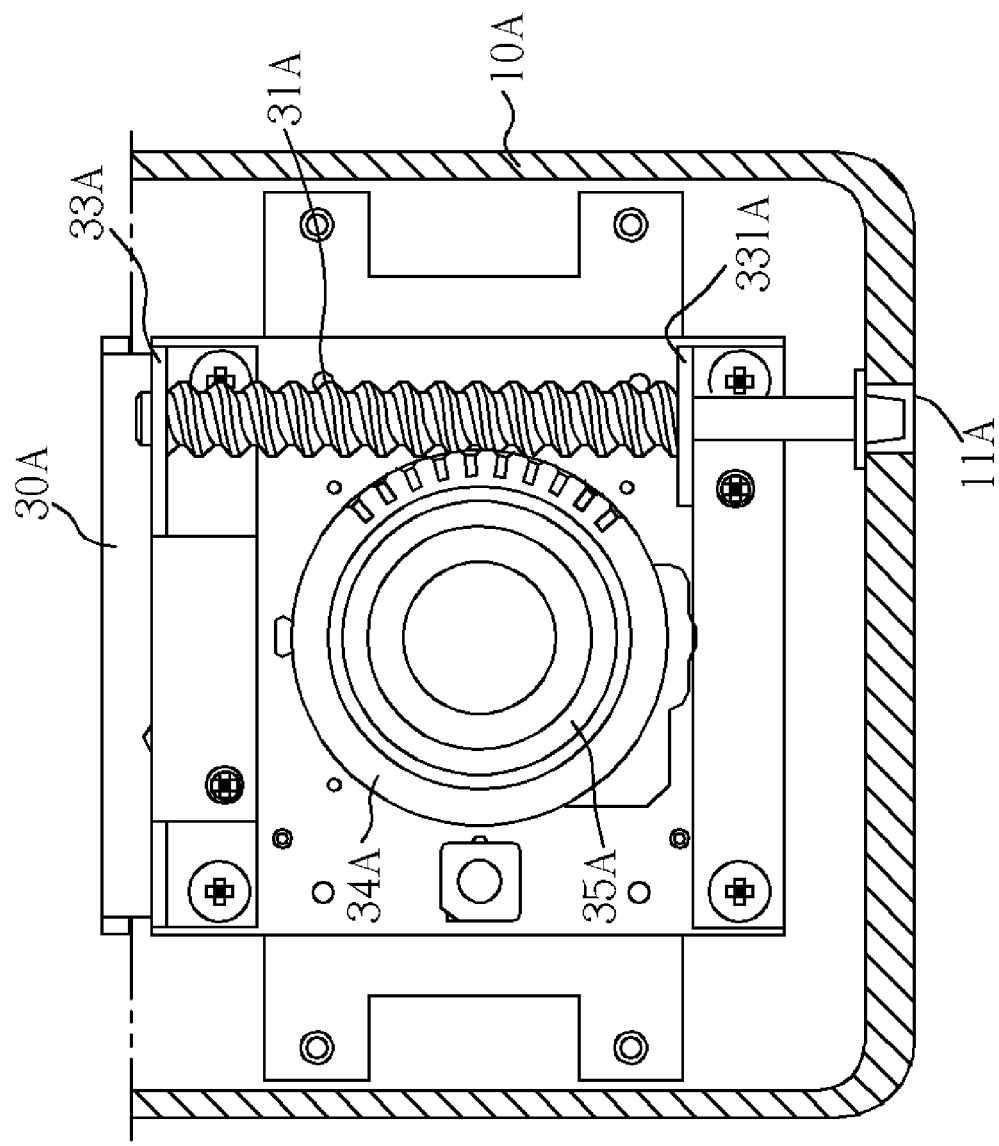
FIG. 7 is a diagram of an adjustment mechanism of the surveillance camera according to the third embodiment of the present invention.
Figure 8:
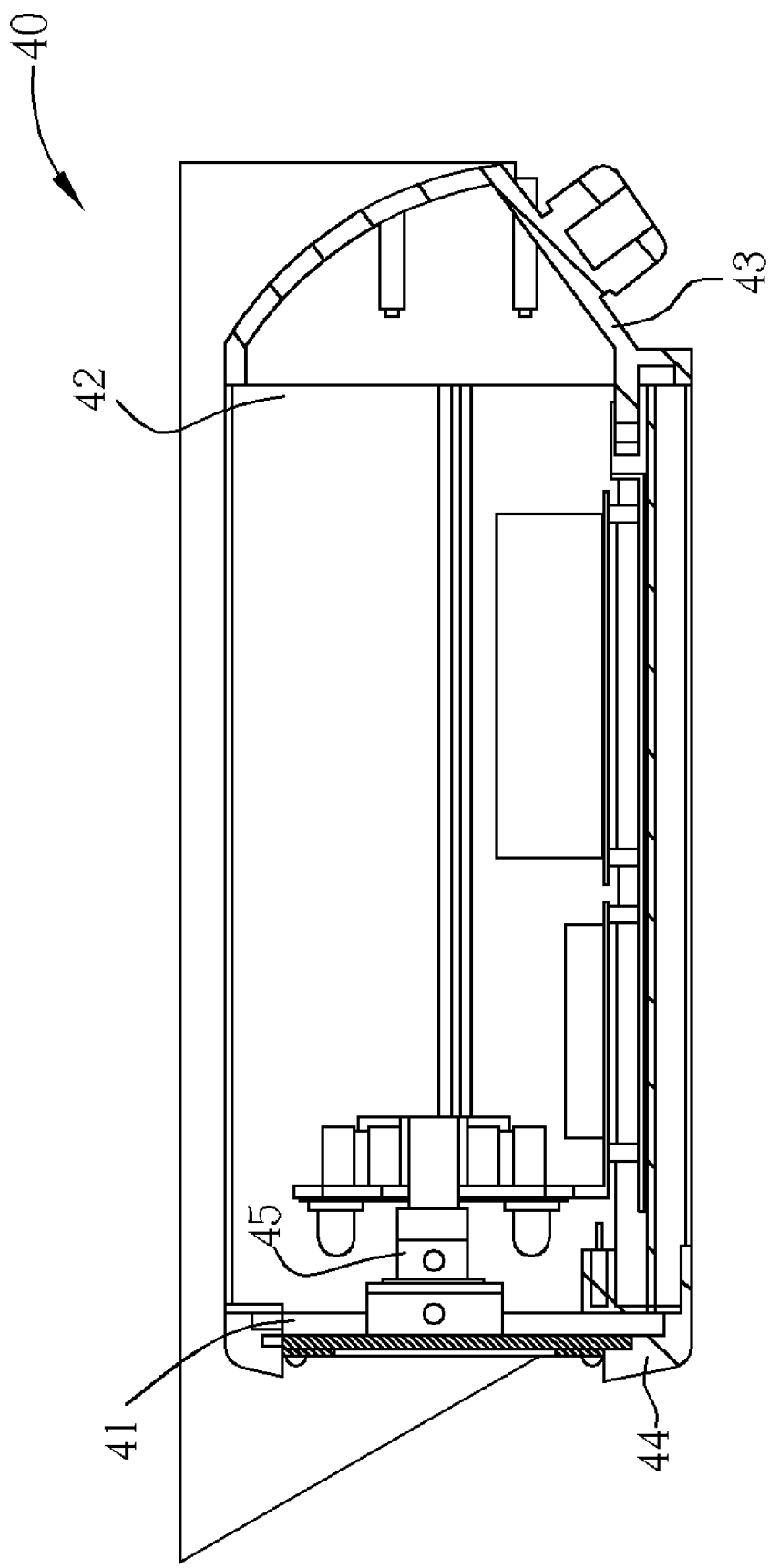
FIG. 8 is a diagram of a surveillance camera according to the prior art.

Please refer to FIG. 7, which is a diagram of a third embodiment of the present invention adjustment mechanism. The third embodiment introduces a modified housing 10A and adjustment screw 31A. The underside of the housing 10A has two holes 11A aligned with two holes of a bottom support piece 331A. The adjustment screw 31A is held by the top support piece 33A and the bottom support piece 331A, and the end of the adjustment screw 31A extends into the hole 11A. The extension of the adjustment screw 31A has a smaller circumference than the hole 11A, and can have a groove formed along its circumference to attach a C-shaped washer. The C-shaped washer holds against the rim of the hole 11A. Turning of the primary adjustment ring 34A or the secondary adjustment ring, and adjustment of the distance and focal length of the photographic lens 35A are as described in the previous embodiments, so further description is omitted.

As can be seen from the above description in the three embodiments of the present invention adjustment mechanism utilized in a surveillance camera, the adjustment mechanism makes adjustment of the distance and focal length of the photographic lens easier and more accurate. Instead of having to remove the cover and turn the adjustment rings directly, the operator can use a screwdriver or the handle, which is faster, and also allows for more precise adjustment of the distance and focal length of the photographic lens.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A surveillance camera comprising:
 a housing;
 a photographic lens installed in the housing comprising:
  a first adjustable lens for adjusting distance;
  a second adjustable lens for adjusting focal length;
  a distance adjustment ring coupled to the first adjustable lens for moving the first adjustable lens; and
  a focal length adjustment ring coupled to the second adjustable lens for moving the second adjustable lens; and
 an adjustment mechanism connected to the photographic lens comprising:
  a support for holding the photographic lens comprising:
   a top support piece having a first hole and a second hole; and
   a bottom support piece having a first hole and a second hole;
  a first adjustment screw held by the first holes of the top support piece and the bottom support piece;
  a second adjustment screw held by the second holes of the top support piece and the bottom support piece;
  a first adjustment ring installed on the distance adjustment ring of the photographic lens comprising teeth corresponding to threading of the first adjustment screw; and
  a second adjustment ring installed on the focal length adjustment ring of the photographic lens comprising teeth corresponding to threading of the second adjustment screw.

2. The surveillance camera of claim 1 further comprising:
 a panel installed on the housing and comprising a first hole aligned with the first hole of the bottom support piece and a second hole aligned with the second hole of the bottom support piece;
 a first rotatable shaft held by the first hole of the panel having an end connected to an end of the first adjustment screw and a head comprising a cavity; and
 a second rotatable shaft held by the second hole of the panel having an end connected to an end of the second adjustment screw and a head comprising a cavity.

3. The surveillance camera of claim 1, wherein the respective ends of the first adjustment screw and the second adjustment screw each have a cavity, and the respective ends of the first rotatable shaft and the second rotatable shaft each have a protrusion corresponding to the cavities for connecting the rotatable shafts to the adjustment screws.

4. The surveillance camera of claim 1, wherein the first adjustment ring and the second adjustment ring each further comprise a hole, and the surveillance camera further comprises screws passing through the holes of the two adjustment rings for connecting the two adjustment rings to the distance adjustment ring and the focal length adjustment ring, respectively.

5. The surveillance camera of claim 2, wherein the circumferences of the first rotatable shaft and the second rotatable shaft each comprise a groove, and C-shaped washers are installed in the grooves to catch against rims of the first hole and the second hole of the bottom panel, respectively.

6. A surveillance camera comprising:
 a housing;
 a photographic lens installed in the housing comprising:
  a first adjustable lens for adjusting distance;
  a second adjustable lens for adjusting focal length;
  a distance adjustment ring coupled to the first adjustable lens for moving the first adjustable lens; and
  a focal length adjustment ring coupled to the second adjustable lens for moving the second adjustable lens;
 an adjustment mechanism comprising:
  a support for holding the photographic lens comprising a top support piece comprising a first hole and a second hole, and a bottom support piece comprising a first hole aligned with the first hole of the top support piece and a second hole aligned with the second hole of the top support piece;

a first adjustment ring installed on the distance adjustment ring of the photographic lens, a side of the first adjustment ring comprising a plurality of teeth;

a second adjustment ring installed on the focal length adjustment ring of the photographic lens, a side of the second adjustment ring comprising a plurality of teeth;

a first adjustment screw held by the first hole of the top support piece and the first hole of the bottom support piece, the first adjustment screw comprising threading corresponding to the plurality of teeth of the first adjustment ring, and an end of the first adjustment screw comprising a cavity; and a second adjustment screw held by the second hole of the top support piece and the second hole of the bottom support piece, the second adjustment screw comprising threading corresponding to the plurality of teeth of the second adjustment ring, and an end of the second adjustment screw comprising a cavity;

a first handle connected to the first adjustment screw; and a second handle connected to the second adjustment screw.

7. The surveillance camera of claim 6, wherein the first handle comprises a cavity with a protrusion corresponding to the cavity of the first adjustment screw, and the second handle comprises a cavity with a protrusion corresponding to the cavity of the second adjustment screw.

8. The surveillance camera of claim 7, wherein the cavities of the adjustment screws and the protrusions of the handles are rectangular, Phillips-shaped, or polygonal.

9. The surveillance camera of claim 6, wherein the first adjustment ring and the second adjustment ring each further comprise a hole, and the surveillance camera further comprises screws passing through the holes of the two adjustment rings for connecting the two adjustment rings to distance adjustment ring and the focal length adjustment ring, respectively.

10. A surveillance camera comprising:

a housing comprising a first hole and a second hole;

a photographic lens installed in the housing comprising:
 a first adjustable lens for adjusting distance;
 a second adjustable lens for adjusting focal length;
 a distance adjustment ring coupled to the first adjustable lens for moving the first adjustable lens; and
 a focal length adjustment ring coupled to the second adjustable lens for moving the second adjustable lens; and an adjustment mechanism comprising:
 a support for holding the photographic lens comprising:
  a top support piece having a first hole aligned with the first hole of the housing and a second hole aligned with the second hole of the housing; and
  a bottom support piece having a first hole aligned with the first hole of the housing and a second hole aligned with the second hole of the housing;
 a first adjustment ring installed on the distance adjustment ring of the photographic lens, a side of the first adjustment ring comprising a plurality of teeth;
 a second adjustment ring installed on the focal length adjustment ring of the photographic lens, a side of the second adjustment ring comprising a plurality of teeth;
 a first adjustment screw connected between the first hole of the top support piece and the first hole of the housing, the first adjustment screw comprising threading corresponding to the plurality of teeth of the first adjustment ring, and an end of the first adjustment screw comprising a cavity; and
 a second adjustment screw connected between the second hole of the top support piece and the second hole of the housing, the second adjustment screw comprising threading corresponding to the plurality of teeth of the second adjustment ring, and an end of the second adjustment screw comprising a cavity.

11. The surveillance camera of claim 10, wherein the first adjustment ring and the second adjustment ring each further comprise a hole, and the surveillance camera further comprises screws passing through the holes of the two adjustment rings for connecting the two adjustment rings to distance adjustment ring and the focal length adjustment ring, respectively.

12. The surveillance camera of claim 11, wherein the circumferences of the first adjustment screw and the second adjustment screw each comprise a groove, and C-shaped washers are installed in the grooves to catch against rims of the first hole and the second hole of the housing, respectively.

* * * * *